US006371149B1

(12) United States Patent
Gust et al.

(10) Patent No.: US 6,371,149 B1
(45) Date of Patent: Apr. 16, 2002

(54) SHUTTLE VALVE ASSEMBLY AND IMPROVED SHIFTING THEREOF

(75) Inventors: Michael J. Gust, Chanhassen; Marvin L. Bernstrom, Eden Prairie, both of MN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/603,398

(22) Filed: Jun. 26, 2000

(51) Int. Cl.[7] .............................................. F16K 11/07

(52) U.S. Cl. .............. 137/112; 137/630.22; 137/630.14

(58) Field of Search ................................ 137/112, 113, 137/630.14, 630.19, 630.22

(56) References Cited

U.S. PATENT DOCUMENTS

| | | | | |
|---|---|---|---|---|
| 3,740,106 A | * | 6/1973 | Horowitz | 303/71 |
| 4,024,797 A | * | 5/1977 | Johnson | 91/514 |
| 4,187,871 A | * | 2/1980 | Hendrickson | 137/112 |
| 4,253,481 A | * | 3/1981 | Sarlls, Jr. | 137/112 |
| 4,343,601 A | | 8/1982 | Thorson | 418/61 B |
| 4,448,211 A | * | 5/1984 | Yoshida | 137/112 |
| 4,467,825 A | * | 8/1984 | Boyd | 137/112 |
| 5,297,860 A | * | 3/1994 | Nakamura | 303/113.2 |
| 5,460,203 A | * | 10/1995 | Smith et al. | 137/630.22 |
| 6,033,192 A | * | 3/2000 | Wood | 133/630.14 X |
| 6,196,252 B1 | * | 3/2001 | Martin et al. | 137/102 |

FOREIGN PATENT DOCUMENTS

| | | | | |
|---|---|---|---|---|
| GB | 827765 | * | 2/1957 | 137/112 |
| GB | 811485 | * | 5/1957 | 137/112 |

* cited by examiner

*Primary Examiner*—John Rivell
*Assistant Examiner*—Meredith H. Schoenfeld
(74) *Attorney, Agent, or Firm*—L. J. Kasper

(57) ABSTRACT

A fluid pressure device including a housing (13) defining a high pressure port (31) and a low pressure port (33). The housing defines a shuttle bore (35) and disposed therein is a shuttle valve assembly (51) including a shuttle spool (63). The shuttle spool (63) defines a fluid passage (87) disposed to provide fluid communication from the low pressure chamber (57) to the shuttle outlet port (85) as the shuttle spool moves from its neutral position (FIG. 2) to the end of its centered range of positions (FIG. 3). The low pressure fluid from the chamber (57) is communicated through the fluid passage (87) and acts on a shuttle poppet member (75), aiding the shuttle spool (63) and its shoulder (67) and unseating (opening) the poppet member (75), thus reducing the fluid pressure in the high pressure chamber (55) required to begin opening the shuttle valve assembly (51). Thus, diversion of fluid, for cooling or lubrication, will occur over a greater range of device operating pressures, minimizing the chance for damage to system components.

1 Claim, 2 Drawing Sheets

SHUTTLE VALVE ASSEMBLY AND IMPROVED SHIFTING THEREOF

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to fluid pressure devices, and more particularly, to such devices which are used primarily in closed loop hydraulic circuits, wherein the fluid pressure device includes a shuttle valve arrangement.

Although it should become apparent from the subsequent description that the invention may be useful with many types of fluid pressure devices, it is especially advantageous when used with a low-speed, high torque hydraulic motor, and will be described in connection therewith. Furthermore, although the invention may be used with fluid pressure devices having various types of displacement mechanisms, the invention is especially useful in a device including a gerotor displacement mechanism and will be described in connection therewith.

The use of low-speed, high-torque (LSHT) gerotor motors is becoming increasingly common in closed loop hydraulic circuits, i.e., a circuit in which the outlet port of the motor is connected directly to the inlet port of the pump, rather than to the system reservoir. This is especially true in regard to mobile applications, such as agricultural and construction equipment in which the gerotor motor is used to propel the vehicle wheels.

In closed loop propel circuits of the type described, it is frequently necessary to divert a portion of the return fluid flow (i.e., the flow from the motor outlet to the pump inlet), and pass the diverted flow through a heat exchanger to prevent overheating of the system fluid. This is normally accomplished by means of a shuttle valve assembly ("hot oil shuttle") installed in the motor to provide fluid communication between the low pressure (return) side of the motor and a shuttle port. The shuttle port is then connected by means of a cooler line to the inlet of the heat exchanger, and after the diverted fluid flows through the heat exchanger, it then flows to the pump inlet.

Typical, prior art hot oil shuttle designs require that the inlet pressure be approximately twice the return side pressure, in order to cause the shuttle assembly to shift from a centered (closed) position to an open position and permit flow from the return side to the shuttle port. The prior art two-to-one relationship was not a problem when the main system pump was controlled manually, and the charge pump maintained the low (return) side of the loop at about 200 psi. In that case, when the fluid entering the motor inlet port reached about 400 psi, the hot oil shuttle would shift and begin to cool the system fluid.

However, more recently, many of the pumps used in propel applications, instead of being controlled manually, have had their displacement controlled by a fluid pressure operated servo. A typical servo might require a pressure in the range of about 400 psi for proper operation, such that the charge pump in such a system must maintain the low pressure side of the loop at 400 psi. As a result, using the prior art hot oil shuttle, operating on the above-described two-to-one relationship, means that the shuttle valve will not open until the fluid on the high pressure side of the loop reaches about 800 psi.

In many applications of such a propel system as described above, the system could operate for an extended period of time without the system pressure reaching the pressure level required to open the prior art hot oil shuttle. The result would be overheating of the system fluid, and potentially, substantial damage to various parts of the closed loop hydrostatic system.

BRIEF SUMMARY OF THE INVENTION

Accordingly, it is an object of the present invention to provide an improved fluid pressure device of the type including a shuttle valve assembly which overcomes the above-described problems of the prior art.

It is a more specific object of the present invention to provide a shuttle valve assembly which is able to open at substantially less than a two-to-one relationship of inlet pressure (high pressure) to return pressure (low pressure).

It is an even more specific object of the present invention to provide such an improved shuttle valve assembly, which accomplishes the above-stated objects, and in which the relatively elevated return pressure is used to assist in the movement of the shuttle valve poppet (i.e., the one on the low pressure side) from its closed position to its open position.

The above and other objects of the present invention are accomplished by the provision of an improved fluid pressure device including a housing defining a high pressure fluid port and a low pressure fluid port. The housing further defines a shuttle bore including a high pressure chamber in fluid communication with the high pressure port and a low pressure chamber in fluid communication with the low pressure port and a shuttle outlet port in fluid communication with the shuttle bore at a location axially intermediate the high and low pressure chambers. The shuttle bore defines a first valve seat disposed adjacent the high pressure chamber and a second valve seat disposed adjacent the low pressure chamber. A shuttle assembly is disposed in the shuttle bore including a shuttle spool reciprocably disposed in the shuttle bore, a first poppet and means biasing the first poppet into engagement with the first valve seat, and a second poppet and means biasing the second poppet into engagement with the second valve seat when the shuttle spool is in a centered range of positions. The shuttle spool extends axially through, and is surrounded by, each of the poppets and includes engagement means operable to engage and move the second poppet out of engagement with the second valve seat as the shuttle spool moves from the centered range of positions to a first activated position in response to high pressure fluid in the high pressure chamber.

The improved fluid pressure device is characterized by the shuttle spool defining a fluid passage disposed to provide fluid communication from the low pressure chamber to the shuttle outlet port, as the shuttle spool approaches the end of the centered range of positions. As a result, fluid pressure in the low pressure chamber is communicated to the shuttle bore surrounding the shuttle spool and acts on the second poppet, in opposition to the means biasing the second poppet, as the engagement means engages and moves the second poppet out of engagement with the second valve seat.

DETAILED DESCRIPTION OF THE PREFERRED EMBODIMENT

Figure 1:
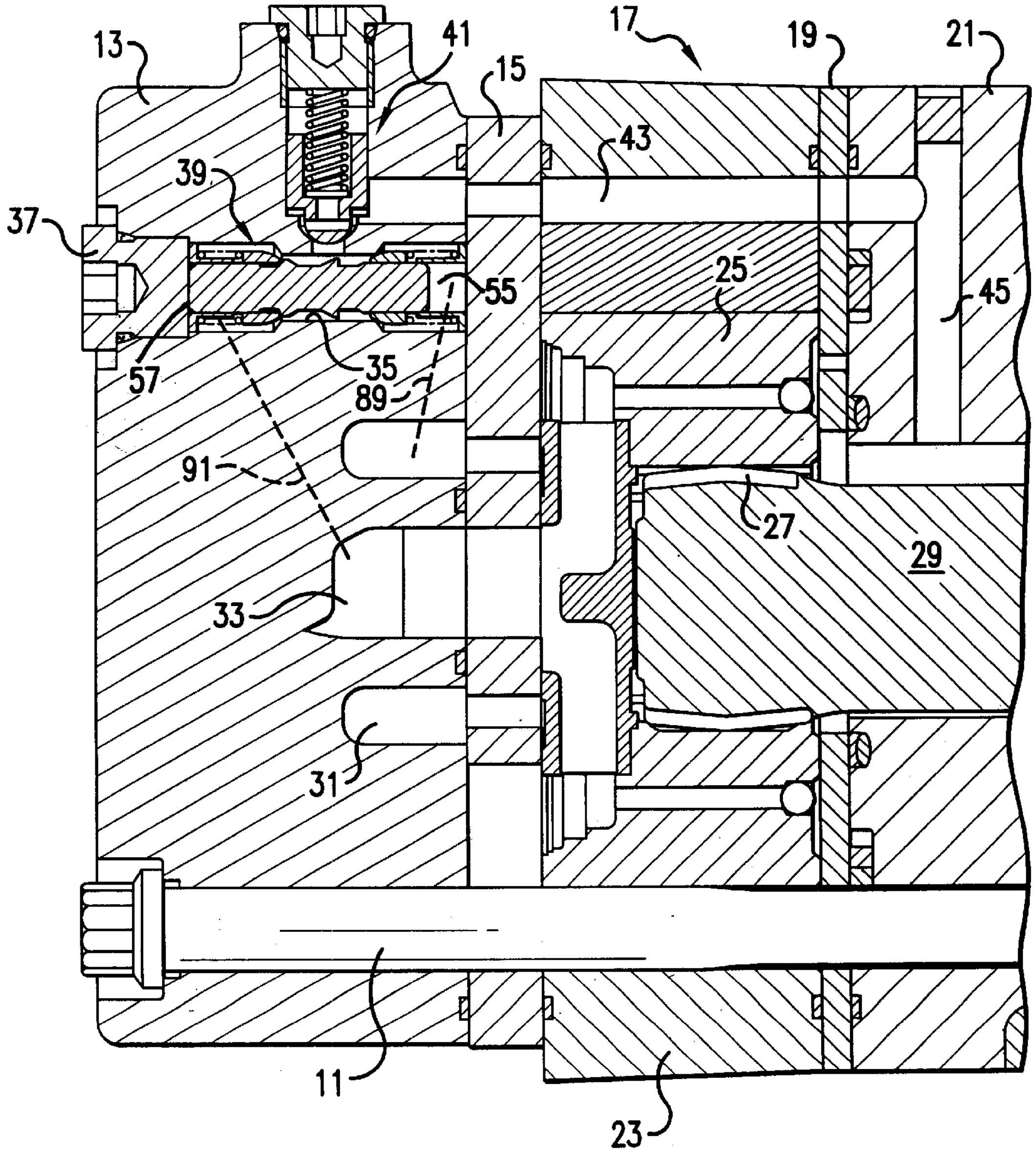
FIG.1 PRIOR ART
FIG. 1 is a fragmentary, axial cross-section of a low-speed, high-torque gerotor motor including a typical prior art shuttle valve assembly of the type which may advantageously utilize the present invention.

Referring now to the drawings, which are not intended to limit the invention, FIG. 1 illustrates a gerotor motor incorporating a prior art shuttle valve assembly. By way of example only, the motor shown in FIG. 1 may be made in accordance with the teachings of U.S. Pat. Nos. 5,211,551 and 5,624,248, both of which are assigned to the assignee of the present invention and incorporated herein by reference. However, those skilled in the art will understand that the present invention applies equally to any other fluid pressure device having a high pressure port and a low pressure port, in which it is desired to divert some of the fluid from the low pressure port to another location, As was mentioned in the BACKGROUND OF THE DISCLOSURE, the "other location" could be an external heat exchanger. However, the "other location" could also be internal to the fluid pressure device, such as a motor lubrication circuit, in accordance with the teachings of U.S. Pat. No. 4,645,438, also assigned to the assignee of the present invention and incorporated herein by reference. In accordance with the present invention, the specifics of the "other location", and the particular use of the diverted fluid are not essential features of the invention.

The motor shown fragmentarily in FIG. 1 comprises a plurality of sections secured together such as by a plurality of bolts 11, only one of which is shown in FIG. 1. The motor includes an end cap 13, a stationary valve plate 15, a gerotor gear set, generally designated 17, a balancing plate 19, and a forward housing member 21.

The gerotor gear set 17 is well known in the art, is shown and described in greater detail in the above-incorporated patents, is not an essential feature of the invention, and therefore will be described only briefly herein. The gear set 17 comprises an internally toothed ring member 23, and eccentrically disposed within the ring member 23 is an externally toothed star member 25, typically having one less external tooth than the number of internal teeth. As a result, the star member 25 orbits and rotates relative to the ring member 23, thus defining a plurality of expanding and contracting fluid volume chambers (not shown herein). The star member 25 defines a plurality of internal splines which are in engagement with a set of external, crowned splines 27, formed on a rearward end of a main drive shaft 29. Typically, the forward end of the drive shaft 29 would be in splined engagement with an output device, such as a wheel hub.

The end cap 13 includes a fluid inlet port and fluid outlet port, which are not shown in FIG. 1. The fluid inlet port feeds an annular chamber 31, while the outlet port receives fluid from a central, cylindrical chamber 33. Thus, references hereinafter and in the appended claims to the inlet and outlet ports will be understood to mean and include the chambers 31 and 33, respectively, and will bear those reference numerals.

The end cap 13 defines an axially oriented shuttle bore 35, sealed at the rearward end thereof by means of a threaded plug 37. Disposed in the shuttle bore 35 is a shuttle valve assembly, generally designated 39, shown herein as being made in accordance with the teachings of U.S. Pat. No. 4,343,601, assigned to the assignee of the present invention and incorporated herein by reference. The outlet of the shuttle valve assembly is the inlet of a charge pressure relief valve, generally designated 41. The outlet of the relief valve 41 is a fluid passage 43 extending axially through the end cap 13, the valve plate 15, the ring member 23 and the housing 21. The fluid passage 43 empties into a radial passage 45 which communicates the diverted fluid into a case drain region surrounding the drive shaft 29, in a manner well know to those skilled in the art.

Figure 2:
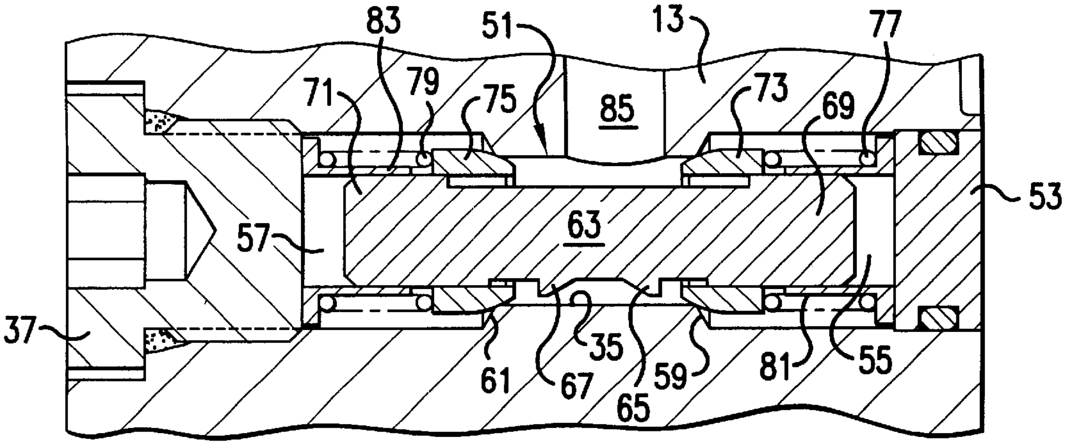
FIGS. 2, 3 and 4 are greatly enlarged, fragmentary, axial cross-sections, similar to FIG. 1, but illustrating the shuttle valve assembly of the present invention in its three primary operation positions.

Referring now primarily to FIG. 2, there will be a description of a shuttle valve assembly, generally designated 51, made in accordance with the present invention. Disposed within the right hand end of the shuttle bore 35 is a sealed plug 53 which, under fluid pressure, would be pressed against the adjacent end face of the stationary valve plate 15. The shuttle bore 35 opens, at its right end, into a high pressure chamber 55, and opens, at its left end, into a low pressure chamber 57. The bore 35 intersects the high pressure chamber 55 at a shuttle valve seat 59, and similarly, the bore 35 intersects the low pressure chamber 57 at a shuttle valve seat 61.

The shuttle valve assembly 51 comprises an axially moveable spool member 63, which includes a pair of integrally-formed shoulders 65 and 67, the function of which will become apparent subsequently. As may be seen in FIG. 2, the shuttle spool 63 includes axially opposite end portions 69 and 71 which are somewhat larger in diameter than is the center portion of the spool 63. In the prior art shuttle valve assembly made in accordance with the teachings of the above-incorporated U.S. 4,343,601, the spool member was "uniform" in the sense that a transverse cross-section taken through the spool would have a circular shape at any point along the axial length of the spool. Such is not the case with the spool member 63 of the present invention, as will be described in greater detail subsequently.

Moveably disposed about the end portions 69 and 71 is a pair of annular poppet members 73 and 75, respectively. The poppet member 73 is biased toward engagement with the valve seat 59 by means of a biasing spring 77, and similarly, the poppet member 75 is biased toward engagement with the valve seat 61 by means of a biasing spring 79. When the fluid pressure in the pressure chambers 55 and 57 is approximately the same, which occurs primarily when the motor is not operating, the shuttle valve assembly will be in its neutral or centered position as shown in FIG. 2. In the neutral position of the shuttle valve assembly 51, both of the poppet members 73 and 75 are biased into engagement with their seats 59 and 61, respectively, and the spool member 63 is centered within the bore 35 by the equal pressures in the pressure chambers 55 and 57.

Disposed radially between the end portion 69 and the biasing spring 77 is a dampening sleeve 81, and similarly, disposed radially between the end portion 71 and the biasing spring 79 is a dampening sleeve 83. It should be noted that the dampening sleeves 81 and 83 each include a radially extending flange portion, seated against the plugs 53 and 37, respectively. The flange portions serving as seats for the biasing springs 77 and 79, respectively. The function of the dampening sleeves 81 and 83 is now well know to those skilled in the shuttle valve art, especially in view of the teachings of the above-incorporated patents, and because the function of the sleeves 81 and 83 is not an essential feature of the invention, the sleeves 81 and 83 will not be described further herein.

Figure 3:
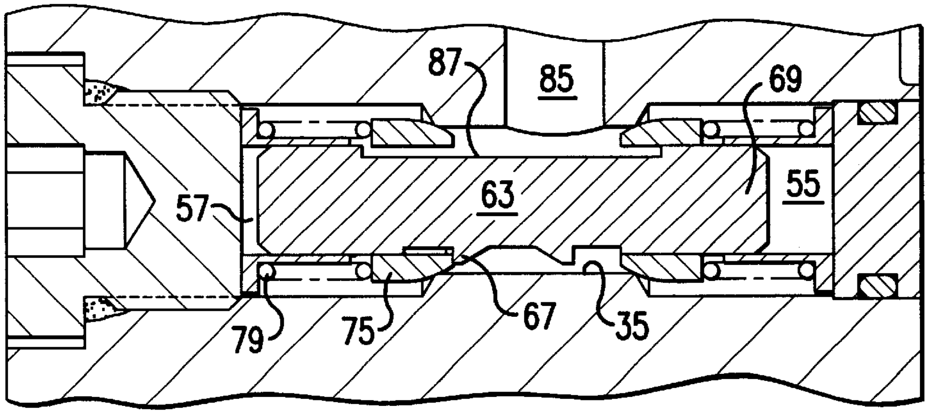

In the subject embodiment, the shuttle valve assembly 51 is of the closed center type, i.e., when the spool member 63 is centered, both of the poppet members 73 and 75 are closed, preventing flow from either of the pressure chambers 55 or 57 to a shuttle outlet port 85. It should be noted that if the shuttle valve assembly 51 of the invention were being used in the environment of FIG. 1, the shuttle outlet port 85 would be the inlet to the charge pressure relief valve 41. There will be references hereinafter, and in the appended claims to the spool member 63 having or being in a "centered range of positions" and such terminology will be understood to mean and include the range of positions as the spool member 63 moves from the perfectly centered position shown in FIG. 2 all the way, in either direction, to the position such as is shown in FIG. 3 in which the shoulder 67 first engages the poppet member 75. The significance of this term "centered range of positions" will become apparent subsequently, in connection with the description of the primary features of the present invention.

Referring now primarily to FIG. 3, in accordance with an important aspect of the invention, the spool member 63 defines an axially extending fluid passage 87 shown herein as comprising a flat surface formed on the spool member 63 by any suitable manufacturing operation, such as a milling operation. What is most significant about the fluid passage 87, dimensionally, is its axial length. As may best be seen in FIG. 2, when the shuttle valve assembly 51 is centered, both axial ends of the fluid passage 87 are "covered" by the poppet members 73 and 75, such that there is no fluid communication permitted from either of the pressure chambers 55 or 57, respectively, into the fluid passage 87.

Referring again primarily to FIG. 1, and as is well known to those skilled in the art, there is a fluid passage 89 communicating from the annular chamber (fluid inlet port) 31 to the high pressure chamber 55, and similarly, there is a fluid passage 91 communicating from the cylindrical chamber (fluid outlet port) 33 to the low pressure chamber 57. The fluid passages 89 and 91 are illustrated only schematically in FIG. 1, as the configuration details of the passages 89 and 91 are not essential features of the present invention, and could be the same for use with the invention as they would have been in the prior art of FIG. 1.

Referring again primarily to FIG. 3, as the spool member 63 approaches the end of the centered range of positions, and just before the shoulder 67 engages the poppet member 75, the left hand end of the fluid passage 87 passes beyond the left-hand end of the poppet member 75, thus opening up fluid communication from the low pressure chamber 57 into the fluid passage 87.

As was described generally in the background of the disclosure, if for example the system charge pump were maintaining the low pressure side of the system at 400 psi, the fluid pressure in the outlet port 33 and in the low pressure chamber 57 would also be approximately 400 psi. In that case, and using the prior art shuttle valve assembly 39, the shuttle valve would not begin to open communication from the low pressure chamber 57 to the shuttle outlet port 85 until the fluid pressure in the inlet port 31 and in the high pressure chamber 55 reached approximately 800 psi. Such would be the case because the only force tending to open the shuttle (i.e., unseat the poppet member 75 from its seat 61 in opposition to the force of the biasing spring 79) would be the 800 psi acting on the cross-sectional area of the end portion 69 of the spool member 63.

However, in accordance with an important aspect of the invention, as the spool member 63 approaches the end of the centered range of positions, as shown in FIG. 3, the fluid communication from the low pressure chamber 57 into the fluid passage 87 raises the fluid pressure within the shuttle bore 35, surrounding the central portion of the spool member 63, this same pressure now also being present in the shuttle outlet port 85. If the invention were to be used in the environment shown in FIG. 1, the pressure at the shuttle outlet port 85 would be determined by the setting of the charge pressure relief valve, such pressure typically being, by way of example only, about 200 psi. Those skilled in the art will understand that for the present invention to operate properly, there must be some sort of flow restriction downstream of the shuttle outlet port 85, in order to cause an appropriate back pressure at the outlet of the shuttle, and surrounding the central portion of the spool 63.

Figure 4:
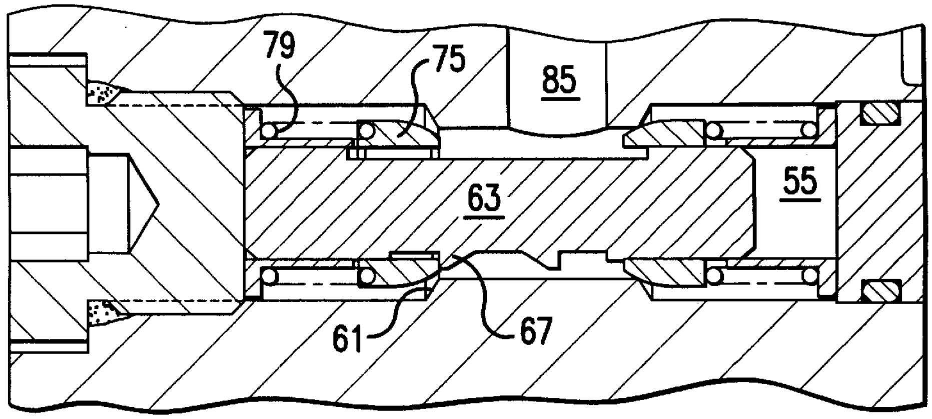

With the fluid pressure in the low pressure chamber 57 now being communicated through the fluid passage 87 to the shuttle outlet port 85, this increased pressure surrounding the central portion of the spool 63 acts on the right end of the poppet member 75, aiding the biasing force exerted on the poppet member 75 by the shuttle spool 63 and its shoulder 67. As a result, with the present invention, the shuttle valve assembly 51 will shift from the end of the centered range of positions, as shown in FIG. 3 to an activated (open) position as shown in FIG. 4. Instead of requiring approximately 800 psi in the high pressure chamber 55, as was required with the prior art shuttle valve assembly 39, the shifting from the centered position of FIG. 3 to the open position of FIG. 4 will begin to occur with substantially less than 800 psi in the high pressure chamber 55. By way of example only, in connection with the development of the subject embodiment of the invention, the poppet member 75 would begin to disengage from its valve seat 61 once the pressure in the high pressure chamber 55 reached approximately 75 psi. over the pressure in the low pressure chamber 57, which, in connection with the example cited above, would be a pressure in the high pressure chamber 55 of about 275 psi. Thus, as long as the pressure at the inlet port 31 would be in excess of about 275 psi., the shuttle valve assembly 51 of the present invention would insure shuttle flow.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A fluid pressure device including a housing defining a high pressure fluid port and a low pressure fluid port; said housing further defining a shuttle bore including a high pressure chamber in fluid communication with said high pressure fluid port, a low pressure chamber, in fluid communication with said low pressure fluid port, and a shuttle outlet port in fluid communication with said shuttle bore at a location axially intermediate said high pressure chamber and said low pressure chamber; said shuttle bore defining a first valve seat disposed adjacent said high pressure chamber and a second valve seat disposed adjacent said low pressure chamber; a shuttle assembly disposed in said shuttle bore, including a shuttle spool reciprocably disposed in said shuttle bore, a first poppet, and means biasing said first poppet into engagement with said first valve seat, and a second poppet, and means biasing said second poppet into engagement with said second valve seat, when said shuttle spool is in a centered range of positions; said shuttle spool extending axially through, and being surrounded by, each of said first and second poppets, and including engagement means operable to engage and move said second poppet out of engagement with said second valve seat as said shuttle spool moves from said centered range of positions to a first activated position in response to high pressure fluid in said high pressure chamber; characterized by:

(a) said shuttle spool defining a fluid passage disposed to provide fluid communication from said low pressure chamber to said shuttle outlet port, as said shuttle spool approaches the end of said centered range of positions;

(b) whereby, fluid pressure in said low pressure chamber is communicated to said shuttle bore surrounding said shuttle spool and acts on said second poppet, in opposition to said means biasing said second poppet, as said engagement means engages and moves said second poppet out of engagement with said second valve seat.

* * * * *